Jan. 5, 1937.                    H. F. BROWN                     2,066,761
                             TROLLEY WIRE LUBRICATOR
                               Filed Nov. 20, 1935

Inventor
HARRY F. BROWN
By
                Attorney

Patented Jan. 5, 1937

2,066,761

UNITED STATES PATENT OFFICE 2,066,761

TROLLEY WIRE LUBRICATOR

Harry F. Brown, New Haven, Conn., assignor to The Ohio Brass Company, Mansfield, Ohio, a corporation of New Jersey Application November 20, 1935, Serial No. 50,731

20 Claims. (Cl. 184—15)

My invention relates to devices for lubricating the trolley wire and particularly for applying a liquid lubricant.

The object of my invention is to provide a device which will apply the lubricant at a greater rate and with less loss than devices of the past.

My invention resides in the new and novel construction, combination and relation of the parts herein described and shown in the accompanying drawing.

In the drawing:—

Figure 1:
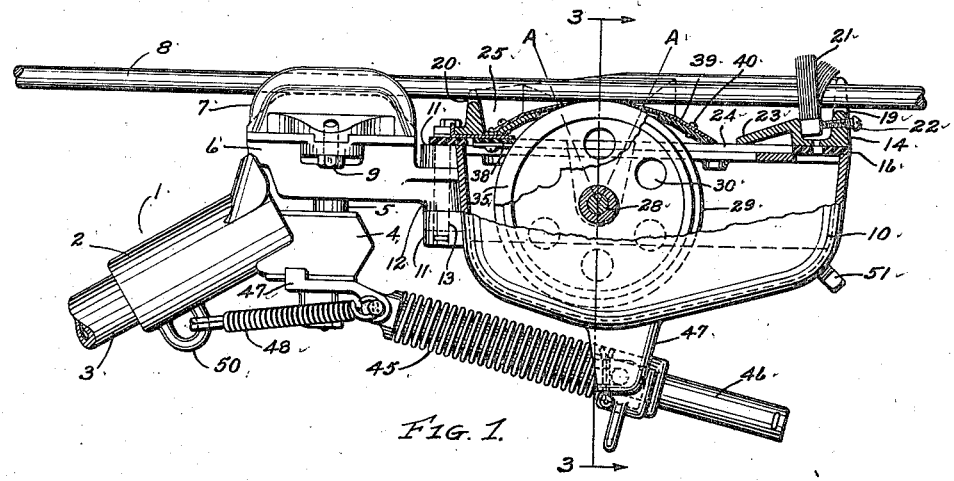
Fig. 1 is a side view in partial section of my invention.
Figure 2:
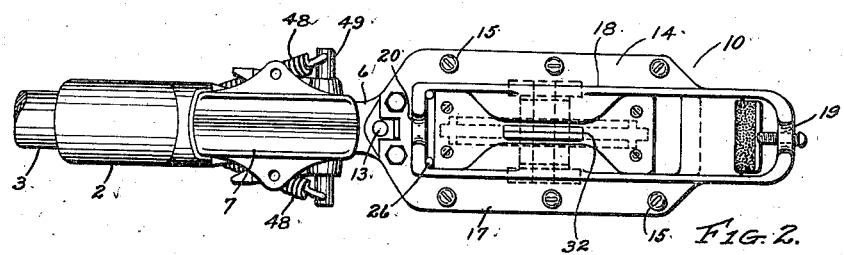
Fig. 2 is a top view of Fig. 1.
Figures 3, 4, 5:
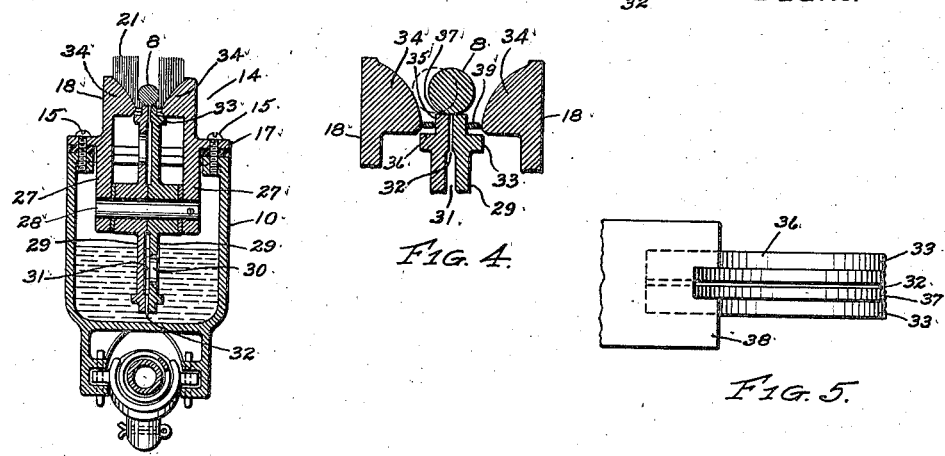
Fig. 3 is a transverse section on the line 3—3 of Fig. 1.
Fig. 4 is an enlargement of the upper portion of Fig. 3.
Fig. 5 is a portion of the lubricant delivering medium and scraper as later explained.

The experience which I have had with devices of the past has been that the rate of application of the lubricant is comparatively slow if the device is operated without loss of lubricant, that is, without being thrown beyond the wire and thus wasted.

The devices of the past are entirely satifactory when used on the smaller systems where the rate of application is not an important matter but on the larger systems where there is practically 24-hour operation and relatively short intervals between cars, the devices of the past cannot be made to properly lubricate the wire at the speed necessary without a very heavy loss of lubricant, or interference with normal traffic.

My invention is in the way of improvements over the devices of the past and lend themselves to reducing the loss mentioned above, at the same time permitting a material increase in the rate of application of the lubricant to the wire. In my invention I substitute two independently rotating elements in place of a single rotating element and arrange to reduce the amount of exposed periphery of the rotating elements.

In the preferred embodiment of my invention I provide a support member 1 which has a socket 2 arranged to receive a trolley pole 3 which is mounted upon the roof of a car which may be the repair car or a car equipped for lubricating purposes only. Projecting from the socket 2 is a shelf-like member 4 with an upright stud 5 secured to the member 4. Mounted upon the stud 5 in pivotal relation thereto is a support 6 and a grooved guide member 7 to engage the trolley wire 8.

The guide member 7 may be an ordinary form of sliding current collector or shoe and tends to maintain the support member 1 in proper relation to the wire 8 as the lubricating device moves therealong.

The members 6 and 7 are secured together by means of the bolts 9 and are arranged to pivot in a horizontal and a vertical plane relative to the stud 5.

Associated with the member 6 is a receptacle 10 arranged to hold a fluid lubricant. The receptacle 10 is provided with lugs 11 which span a lug 12 on the member 6 and are pivotally secured together by means of the pintle 13. The hinge construction between the parts 6 and 10 will permit of a relative movement of the parts 6 and 10 in a substantially horizontal plane. This hinged construction will be found very important when the device is used in rounding curves and passing through special work, otherwise the device will have a tendency to leave the trolley wire.

The receptacle is provided with a cover 14 which is secured to the upper surface of the receptacle 10 by means of screws 15 and a gasket 16 is placed between the cover and the receptacle. Superimposed upon the flange 17 of the cover is a rim 18 forming an elongated pocket for catching and returning to the receptacle excess liquid which may be applied to the wire. The rim is formed with a deep groove 19 at one end and a shallow groove 20 at the other end in which the wire 8 reposes. At one end of the cover is a brush 21 which contacts with the lower and side surfaces of the wire after the lubricant has been applied thereto and this brush removes excess lubricant and distributes that which remains evenly over the contacting surface of the wire. The brush is removable through the medium of the screw 22. To the forward side of the brush 21 is a sloping diaphragm 23 upon which the lubricant from the brush collects when the brush has become saturated and runs back through the opening 24 into the receptacle 10.

The pocket 25 at the opposite end of the cover is provided with corner holes 26 through which any lubricant collecting in the pocket may be returned to the receptacle.

Depending from the lower surface of the cover and into the receptacle are spaced lugs 27 which support the pin or shaft 28. Mounted upon the shaft are two rotating discs 29 provided with side openings 30. The discs are provided with a narrow space 31 therebetween and a still narrower opening 32 connecting the space 31 with the periphery of the discs. The space 32 between the discs I find may be as small as .005". I find that a rotating member constructed of two discs 29 as just described acts very much as a pump in that the liquid passes into the space 31 through the openings 30 and is thrown out through the narrow slot 32.

It will be noted that the exposed portion of the rims of the discs is very small, namely, between the diverging lines A—A and also the exposed width of the discs is less than that of the wire 8. Attention is also drawn to the projecting annular flange 33 which underlies the inwardly projecting cheeks 34 of the cover. This assures that any liquid which adheres to the outer surface of the disc perpendicular to the axis will be thrown off against the lower surface of the cheeks 34 and fall back into the receptacle.

In order to clear the surfaces 35, 36 and 37 of as much lubricant as reasonably possible, a wiper 38 is provided, preferably formed of leather, felt or sheet fibre, which contacts with the surfaces 35, 36 and 37 or substantially so, and removes a very large portion of the lubricant from the discs. Thus there remains only the slot 32 as the chief means for applying the liquid to the wire.

As before stated, the combined width of the surfaces 37 is less than the diameter of the wire, therefore, any lubricant which may tend to be thrown outwardly from the exposed surfaces 35 will strike some portion of the lower surface of the wire and be thus prevented from being thrown past the wire.

If the wire should tend to rest to one side of the center of the discs, as for instance against one of the cheeks 34, then only the one disc contacted by the wire will rotate and the wire will still overlap the opening 32 through which the major portion of the lubricant is delivered.

I have shown the opening between the sides of the discs and the cover as being closed by means of a thin sheet metal member 39 held in place by the screws 40. This is because the sheet metal can be closely fitted to the sides of the discs. However, the member 39 can be formed as an integral part of the cover if desired.

From the above, it will be noted that the rim portions of the discs have been so flanged that the circumferential surface perpendicular to the axis is a minimum and the surface parallel with the tread extends under the cover or guard thus preventing excess liquid being thrown beyond the cover 39.

The combination of the discs and the top casting is to so direct the liquid that it cannot be thrown off the wheel except nearly parallel to the wire and in a stream or spray concentrated on the center of the wire.

It will be evident that the greater the rate of travel, the greater will be the speed of the discs and hence the greater will be the tendency to deliver lubricant from the wheel, but with the construction which I have disclosed no liquid can be thrown outside the cover in any very large quantity. In fact, the faster the discs revolve the better the wire will be covered as the stream of lubricant will be thicker and the liquid will be forced up around the wire to cover the entire under half thereof. The faster the car moves the faster the discs revolve and the more liquid is pumped up and the more wire surface is covered, and any excess fluid will always return to the receptacle.

I have been able to reach a delivery speed with my invention of 35 miles per hour, while with other devices I have only been able to apply the lubricant when traveling at a rate of about 5 or 6 miles per hour without a considerable spraying of the lubricant past the wire and into the atmosphere.

In order to maintain the receptacle in operative position to the trolley wire with the rotating members 29 in contact therewith, I employ a spring 45 normally under compression mounted on a rod 46 which is pivoted to a member 47 which in turn is mounted on the lower end of the stud 5 to pivot relative thereto about a substantially vertical axis such that the rod 46 may pivot in unison with the receptacle 10 both vertically and horizontally.

The spring 45, being under compression and pressing against the lower projecting parts 47, tends constantly to raise the receptacle 10.

In order to assist somewhat in steadying the lateral movement of the receptacle, I employ the two tension springs 48 attached to the pin 49 which forms a part of the member 47 and to the loop 50. These springs also tend to maintain the receptacle 10 in alignment with the vertical plane through the axis of the member 3 without in any way affecting the operation of the spring 45.

I have shown a plug 51 as part of the receptacle 10 and by removing the plug means may be inserted in its place for supplying lubricant to the receptacle, or the lubricant may be supplied by pouring it through the opening 24.

If desired, the slot 32 may have substituted therefor a plurality of spaced holes.

Having disclosed my invention, I claim:—

1. A trolley wire lubricating device comprising a receptacle to hold a fluid lubricant, a support for the receptacle and means to apply the lubricant to the wire as the device moves relative thereto, the said means comprising a pair of discs mounted face-to-face to rotate independently of each other and to dip into the lubricant and convey it to the wire, the axis of the discs being at right angles to the longitudinal axis of the wire.

2. A trolley wire lubricating device comprising a receptacle to hold a fluid lubricant, a support for the receptacle and means to apply the lubricant to the wire to be lubricated as the device moves relative thereto in a longitudinal direction, the said means comprising a pair of closely spaced discs mounted face-to-face to permit a fluid to freely flow therebetween and to rotate in a plane coinciding with the longitudinal axis of the wire and to dip into the lubricant and convey it to the wire.

3. A lubricating device comprising a receptacle to hold a fluid lubricant, a support for the receptacle and means to apply the lubricant to the article to be lubricated as the device moves relative thereto, the said means comprising a pair of discs having an opening therebetween and to dip into the lubricant and convey it to the said article through the opening and means to substantially prevent the application of the lubricant to the article by any other part of the first said means.

4. A lubricating device for a wire comprising a receptacle to hold a lubricant, a support for the receptacle and rotatable means to apply the lubricant to the wire as the device moves along the wire, the said means provided with an interior recess having access to the lubricant in the receptacle and outlet means at its periphery through which the lubricant is delivered and onto the wire through centrifugal force of the rotatable means.

5. A lubricating device for a wire comprising a receptacle to hold a lubricant, a support for the receptacle and means to apply the lubricant to the wire as the device moves along the wire, the said means functioning as a centrifugal pump and having an inlet passage from the interior of the receptacle and an outlet passage through which the lubricant may be delivered to the wire.

6. A lubricating device for a wire comprising a receptacle to hold a lubricant, means to support the receptacle to move along the wire and means to apply the lubricant to the wire, the said means comprising rotating means having an exposed face of less width than the diameter of the wire to engage the surface of the wire and apply the lubricant to the surface thereof.

7. A lubricating device for a trolley wire comprising a receptacle to hold a lubricant, means to support the receptacle to move along the wire and an applicator to distribute the lubricant along the surface of the wire, the said applicator comprising rotative means having an exposed peripheral face of less width than the diameter of the wire and an internal recess having access to the lubricant and opening onto the said exposed face to deliver the lubricant onto the wire and annular projecting flanges on the side faces of said rotative means adjacent the said narrow face and overlapped by the receptacle to materially limit delivery of the lubricant from any part of the rotating means other than the said opening onto the peripheral face.

8. A lubricating device for a wire comprising a receptacle to hold a lubricant, a cover for the receptacle and having an opening therethrough, means to support the receptacle as it moves along the wire and rotative means arranged to engage the wire and apply the lubricant thereto, the rotative means having a peripheral face narrower than the wire and an opening through the face and having communication with the interior of the receptacle and through which opening the lubricant is delivered and a limited portion of the peripheral face exposed through the opening in the cover and side means on the cover adjacent the exposed peripheral face to engage with the wire and limit its side movement relative to the rotative means.

9. A lubricating device for a wire comprising a receptacle to hold a lubricant, a cover for the receptacle and having an opening therethrough, means to support the receptacle as it moves along the wire and rotative means arranged to engage the wire and apply the lubricant thereto, the rotative means having a peripheral face narrower than the wire and an opening through the peripheral face communicating with the interior of the receptacle and through which opening the lubricant is delivered and a limited portion of the peripheral face exposed through the opening in the cover, side means on the cover adjacent the exposed peripheral face to engage with the wire and limit its side movement relative to the rotative means and means at the trailing end of the receptacle to distribute the lubricant on the lower and side surfaces of the wire.

10. A lubricating device for a wire comprising a receptacle to hold a lubricant, a cover for the receptacle and having an opening therethrough, means to support the receptacle as it moves along the wire and rotative means arranged to engage the wire and apply the lubricant thereto, the rotative means having a peripheral face narrower than the wire and an opening through the said face communicating with the interior of the receptacle and through which opening the lubricant is delivered and a limited portion of the peripheral face exposed through the opening in the cover, side means on the cover adjacent the exposed peripheral face to engage with the wire and limit its side movement relative to the rotative means and means through the cover to return excess lubricant to the receptacle.

11. A device to lubricate a trolley wire and move along the wire comprising a receptacle to retain a lubricating material, means to mount the receptacle on a support, means within the receptacle mounted to rotate about an axis and engage a trolley wire and dip into the said lubricating material as the device moves along the wire and apply the material to the wire as the means rotates, the said means being split and the parts slightly separated forming a centrifugal pump, the receptacle being mounted on the support to pivot in a horizontal plane, yielding means to distribute the applied lubricant along the wire and yielding means tending to maintain the receptacle in alignment with the support.

12. A lubricating device for a wire comprising a receptacle to hold a lubricant, a support for the receptacle and rotatable hollow means to apply the lubricant to the wire as the device moves along the wire, the said means having an inlet from the receptacle to the interior thereof and an outlet passage from the interior of the said means through which the lubricant may be delivered to the wire and means to move along the wire with the support and receptacle to guide the support relative to the wire.

13. A lubricating device for a wire comprising a receptacle to hold a lubricant, a support for the receptacle, a centrifugal pump to deliver the lubricant from within the receptacle to a point without the receptacle as the device moves along the wire, the said pump having an outlet passage from the interior of the receptacle through which the lubricant may be delivered, yielding means to distribute the lubricant over the wire surface and means to guide the support and receptacle relative to the wire as they move along the wire.

14. A lubricating device for a trolley wire comprising a receptacle to hold a lubricant, means to support the receptacle to move along the wire and means to deliver the lubricant from within the receptacle to a point without the receptacle, the said means comprising a centrifugal pump operated by contact with the trolley wire as the device moves therealong and having an inlet submerged in the lubricant within the receptacle and an outlet for delivering the lubricant for use on the trolley wire, and means to distribute the lubricant over the surface of the wire.

15. A trolley wire lubricating device comprising a receptacle to hold a fluid lubricant, a support for the receptacle and means to apply the lubricant to the trolley wire as the device moves relative thereto, the said means comprising a pair of spaced rotatable discs mounted face-to-face to rotate about an axis angularly disposed to the axis of the wire and dip into the lubricant and to convey it to the said wire, the space between the discs at the rim being approximately .005″ the space between the discs having an inlet submerged in the lubricant.

16. A lubricating device to apply a fluid lubricant to a wire comprising a receptacle to hold a fluid lubricant, a support for the receptacle and means arranged to contact with the wire to apply the lubricant thereto as the device moves relative to the said wire in a longitudinal direction, the said means comprising a pair of rotatable discs arranged side-by-side and spaced apart a less amount than the diameter of the wire and to dip into the lubricant and convey it to the article to be lubricated through the space between the discs, and means to prevent application of the lubricant by the device to the wire through means other than the space between the discs.

17. A device to lubricate a trolley wire and move along the wire comprising a receptacle to retain a lubricating material, means to mount the receptacle on a support, means within the receptacle to engage a trolley wire and dip into the said lubricating material as the device moves along the wire and distribute the material upon the wire as the means rotates, said means comprising a centrifugal pump having an inlet submerged below the lubricant within the receptacle and an outlet for delivering the lubricant and a passage connecting the inlet and outlet.

18. A lubricant delivery means for a trolley wire lubricating device provided with a receptacle for the lubricant, comprising a pair of disc-like wheels arranged to be mounted and to rotate on an axle positioned within the receptacle of the lubricating device, the discs spaced slightly apart and forming an opening therebetween and having an opening through the side face of at least one disc communicating with the space between the discs and arranged to be submerged for a portion of the revolution in the lubricant within the interior of the receptacle.

19. A lubricating device for a wire comprising a receptacle to hold a lubricant, a cover for the receptacle and having an opening therethrough, means to support the receptacle as it moves along the wire, rotative means having a peripheral face, a limited portion of which is exposed through the opening in the cover and the rotative means arranged to engage the wire and apply the lubricant thereto, the rotative means having a passage extending from the interior of the receptacle through the rotative means and opening onto the peripheral face and through which passage the lubricant is delivered, side means on the cover adjacent the exposed peripheral face to engage with the wire and limit its side movement relative to the rotative means and means to hold the receptacle in alignment with the wire.

20. A device to lubricate a trolley wire and move along the wire comprising a receptacle to retain a lubricating material, means to mount the receptacle on a support, means within the receptacle mounted to rotate about an axis and engage a trolley wire and dip into the said lubricating material as the device moves along the wire and distribute the material upon the wire as the means rotates, the said rotatable means being split on a plane at right angles to its axis and the parts slightly separated forming a free opening therebetween and through which opening the lubricating material may be thrown upon the trolley wire, a portion of the rotatable means being submerged in the lubricant, the receptacle being pivotally mounted on the support to pivot in a plane substantially parallel to the axis of the wire and means constantly urging the rotatable means into contact with the wire.

HARRY F. BROWN.